(12) United States Patent  (10) Patent No.: US 8,766,474 B2
Carralero et al.  (45) Date of Patent: Jul. 1, 2014

(54) SMART MICROGRID RECONFIGURABLE AC INTERFACE

(75) Inventors: Michael A. Carralero, Huntington Beach, CA (US); Jimmy M. Quiambao, Walnut, CA (US); Sang H. Nguyen, Placentia, CA (US)

(73) Assignee: The Boeing Company, Chicago, IL (US)

( * ) Notice: Subject to any disclaimer, the term of this patent is extended or adjusted under 35 U.S.C. 154(b) by 473 days.

(21) Appl. No.: 13/005,419

(22) Filed: Jan. 12, 2011

(65) Prior Publication Data

US 2012/0175955 A1 Jul. 12, 2012

(51) Int. Cl.
*H02J 3/14* (2006.01)
*H02J 7/00* (2006.01)
*H02M 7/48* (2006.01)

(52) U.S. Cl.
USPC .................................. 307/38; 307/65; 363/71

(58) Field of Classification Search
None
See application file for complete search history.

(56) References Cited

U.S. PATENT DOCUMENTS

| 4,588,900 A | 5/1986 | Honjo | |
|---|---|---|---|
| 4,697,136 A | 9/1987 | Ishikawa | |
| 2006/0208574 A1* | 9/2006 | Lasseter et al. | 307/69 |
| 2007/0129110 A1* | 6/2007 | Lasseter et al. | 455/557 |
| 2010/0001587 A1* | 1/2010 | Casey et al. | 307/80 |

FOREIGN PATENT DOCUMENTS

JP 2000 116009 4/2000

OTHER PUBLICATIONS

PCT, International Search Report and Written Opinion, International Application No. PCT/US2011/064499 (May 23, 2012).
Product Literature for "Automatic Voltage Regulator," by Staco Energy Products Co., http://www.stacoenergy.com/pdf/brochures/Voltage%20Regulator%20Brochure-prod.pdf (2010).
Web page featuring "Kohler Automatic Transfer Switches," by Kohler Co., http://www:firemountainsolar.com/manufacturer/kohler/kohler-automatic-transfer-switches/ (2011).
Web page featuring "AC-DC Programmable Power," by TDK-Lambda Americas Inc., http://www.us.tdk-lambda.com (2011).
Web page featuring "Dry-type transformers," by ABB, http://www.abb.com/product/us/9AAC30405576.aspx?country=US (2011).
Web page featuring "Discrete IGBTs," by Fairchild Semiconductor, http://www.fairchildsemi.com/tree/power-management/igbts/discrete-igbts/ (2011).
Web pages of Concept Intelligent Powers Electronics, http://www.igbt-driver.com (2011).
Menniti, D. et al., "Application of a suitable control strategy for grid-connected inverters to the power management of a Microgrid," *Distributed Generation*, pp. 249-264, published by InTech, http:www.intechopen.com (2010).

* cited by examiner

*Primary Examiner* — Jared Fureman
*Assistant Examiner* — Aqeel Bukhari
(74) *Attorney, Agent, or Firm* — Robert B. Parker

(57) ABSTRACT

Presented is a system and method for providing reconfigurable AC interfaces for AC power systems. The method comprises embedding a reconfigurable AC interface for transferring power between power sources and loads, monitoring the voltage and current of the interfaces of the reconfigurable AC interface, and switching between power sources based on the monitoring. The system comprises a reconfigurable AC interface further comprising an inverter for converting DC power to AC, transfer switches with interfaces for connecting to the inverter, other transfer switches, and AC busses, and a controller that dynamically configures the transfer switches to transfer power between the inverter, and AC busses.

20 Claims, 7 Drawing Sheets

SMART MICROGRID RECONFIGURABLE AC INTERFACE

FIELD

Embodiments of the subject matter described herein relate generally to a system and method for a reconfigurable AC interface for microgrids.

BACKGROUND

Many industrialized countries generate a substantial amount of their electricity in large centralized power plants and delivered via power lines on the utility power grid, or utility grid. Power plants are typically fossil fuel based, nuclear or hydroelectric. However, power may be generated locally, for example using local generators, and available solar, wind, or geothermal resources. The locally generated power is typically on its own grid, called a microgrid. Excess power generated on the microgrid can be sold back to the utility by tying the microgrid electrically into the local utility grid and net metering to determine the net flow of electricity into or out of the microgrid.

Traditionally, the utility grid is AC, or alternating current, and a microgrid interfaces to the utility grid using a grid-tie inverter. The grid-tie inverter uses anti-islanding switches that guarantees that the inverter is disconnected from the utility grid if power from the utility is down and only reconnects when utility is operating normally again. The anti-islanding switches are a safety feature that prevents the microgrid from supplying power onto the utility grid when utility workers may be repairing a downed power line or malfunctioning transformer. Although this protects the utility grids from power generated on the microgrid, there remains the possibility of power interruptions on the microgrid itself A microgrid can participate in load-shedding programs with the utilities who then treat the microgrids as dispatchable loads that can be shed by the utility if needed. Owners of microgrids agree to be curtailed up to an agreed number of times and durations. In return, the incentive for the microgrid owner is usually a reduced energy rate that lowers the overall energy bill, or a capacity and/or energy payment for the actual load being placed at risk of interruption. Usually owners are notified when utility service is going to be interrupted and the verification that the customer load was shed as requested takes place ex post based on meter data. The owner can choose not to comply with the direction to shed load as requested, although penalties are often levied for non-compliance and may be severe. In some load-curtailment programs, loads are interrupted immediately and without warning. The present microgrid solutions do not address solutions for enabling loads to continue to be powered while complying with utility load-shedding requests.

As microgrids become more common, their influence on the stability of the grid will increase. Undesirable dynamic interactions triggered by microgrids increase the possibility of key, heavily loaded transmission lines tripping. The present microgrid solutions do not address designs of utility grids that utilize the dynamic nature of microgrids to enhance the stability of the utility grids and the transmission lines.

SUMMARY

Presented is a system and method for managing microgrid electrical connections using a reconfigurable AC interface. In an embodiment, the reconfigurable AC interface maintains uninterruptable power on the microgrid. In an embodiment, the reconfigurable AC interface eliminates the need to shed load by allowing additional energy resources or backup generators to seamlessly be added to the microgrid. In an embodiment, the reconfigurable AC interface enables power to be dynamically added to or taken off of the utility grid to enhance grid stability and permits transmission line power limits to increase.

In an embodiment, the method comprises embedding a reconfigurable AC interface for transferring power between power sources and loads, monitoring the voltage and current of the interfaces of the reconfigurable AC interface, and switching between power sources based on the monitoring.

In an embodiment, the system comprises a reconfigurable AC interface further comprising an inverter for converting DC power to AC, transfer switches with interfaces for connecting to the inverter, other transfer switches, and AC busses, and a controller that dynamically configures the transfer switches to transfer power between the inverter, and AC busses.

In an embodiment, the system comprises inverters for converting DC power sources to AC power, interconnected transfer switches for electrically interconnecting between the inverters, an AC power source, and an AC power bus, sensors for monitoring the AC and DC power sources, and a controller that dynamically configures the interconnected transfer switches to control the flow of power between inverters, the AC power source, and the AC power bus based at least in part upon the readings of the sensors.

The features, functions, and advantages discussed can be achieved independently in various embodiments of the present disclosure or may be combined in yet other embodiments further details of which can be seen with reference to the following description and drawings.

BRIEF DESCRIPTION OF THE DRAWINGS

The accompanying figures depict various embodiments of the system and method for providing a reconfigurable AC interface for microgrids. A brief description of each figure is provided below. Elements with the same reference number in each figure indicated identical or functionally similar elements. Additionally, the left-most digit(s) of a reference number indicate the drawing in which the reference number first appears.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Figure 1:
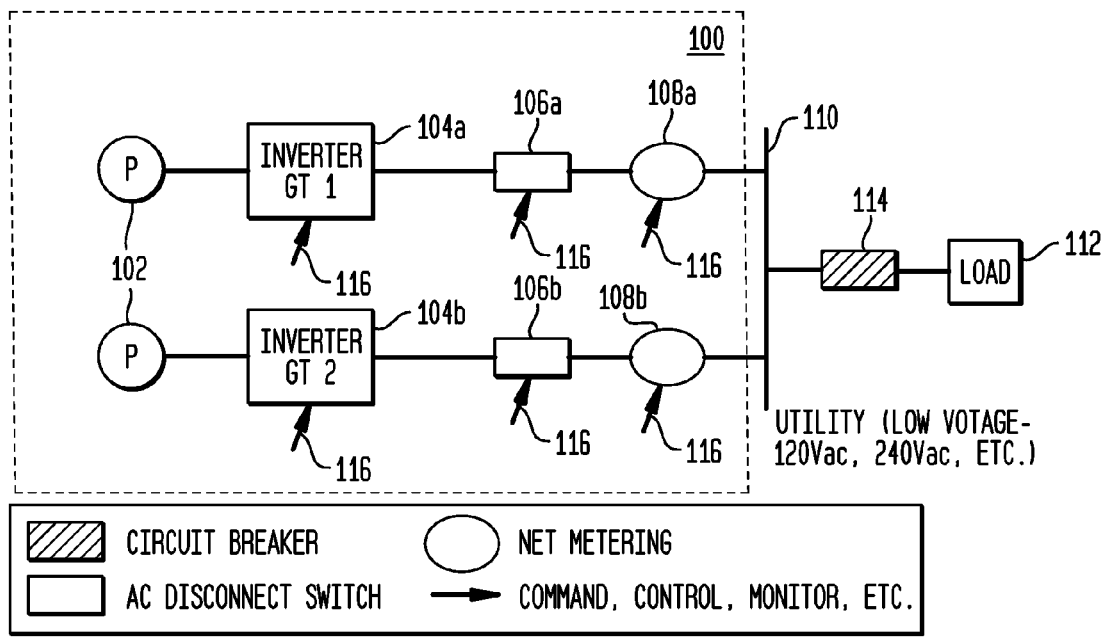
FIG. 1 is a diagram of a grid-tied microgrid having an AC interface to the utility grid.

Distributed energy resource (DER) systems are small-scale power generation technologies (typically in the range of 3 kW to 10,000 kW) used to provide an alternative to or an enhancement of the traditional electric power utility grid maintained by the utility companies. A microgrid is a localized grouping of electricity generation, energy storage, and loads that normally operates connected to a traditional centralized utility grid Referring now to FIG. 1, a traditional configuration for a grid-tied microgrid 100 is presented. In a grid-tied microgrid 100, power source 102a, 102b (collectively power sources 102) is connected to inverter 104a and 104b (collectively inverters 104.) Typical power sources are fossil fuel powered generators, solar panels, wind turbines, or geothermal pumps. The inverters 104 convert the direct current, or DC power of the power sources 102 to alternating current, or AC power suitable for transmission over utility power lines 110 to loads 112 that use the power. The inverters 104 synchronize the phase of the AC power to the phase of the AC power on the utility power lines 110. This is referred to as a grid-tie configuration because the inverters 104 are tied to the grid, or utility power lines 110. Anti-islanding switches, or AC disconnect switches 106a, 106b (collectively AC disconnect switches 106), enable the inverters 104 to disconnect from the utility power lines 110.

The AC disconnect switches 106 disconnect, or trip, when two much power is drawn from the inverters 104. For example when there is a short in the power lines due to lines being crossed or brought down due to storms or accident, the AC disconnect switches 106 will trip and disconnect the inverters 104 from the utility power lines 110. Also, the AC disconnect switches 106 may trip if no power is present on the utility power lines 110, indicating that there is an outage on the utility side. This is a safety feature that prevents the grid-tied microgrid 100 from asserting power onto lines that may be being worked on by utility workers. Further, the AC disconnect switches 106 may disconnect from the utility power lines 110 as a result of a load shedding request by the utility.

In the grid-tied microgrid 100, net metering devices 108a, 108b (collectively net metering devices 108) perform the function of monitoring the power being added to or drawn from the utility power lines 110 by the grid-tied microgrid 100. The AC power from the utility and the grid-tied microgrid 100 is delivered through the utility power lines 110 to the load 112 that uses the power. A circuit breaker 114 is a safety feature for disconnecting the load 112 from the utility power line in the event of an electrical short or other malfunction of the load 112. The circuit breaker 114 can be manually tripped to isolate the load 112 from the utility power lines 110 in order to perform service on the load 112.

In embodiments, there are communication links 116 to one or more of the inverters 104, AC disconnect switches 106, and net metering devices 108 to enable command, control, and monitoring functions. Some non-limiting example protocols and physical layers for the communications links are Supervisory Control and Data Acquisition (SCADA), X..25, TCP/IP, UDP, serial-based communications, fiber-based communications, wireless communications, etc.

Figure 2:
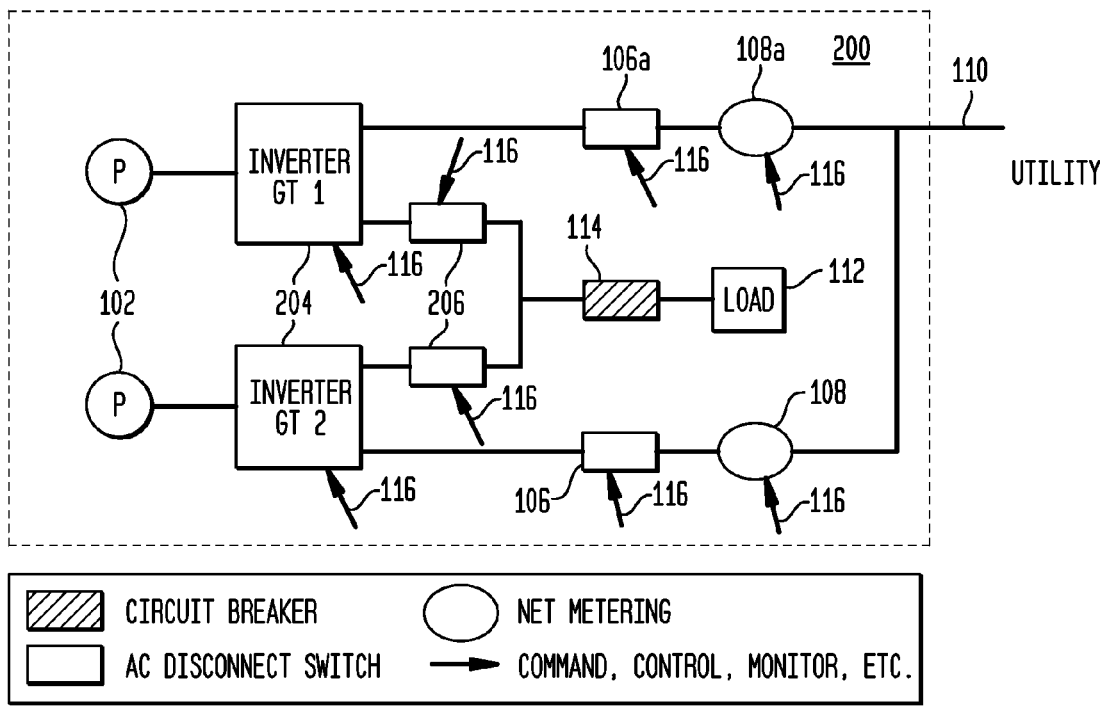
FIG. 2 is a diagram of a uninterruptable microgrid having an AC interface to the utility grid and separate AC interfaces to the load in one embodiment of the reconfigurable AC interface for microgrids.

Referring now to FIG. 2, an embodiment of an uninterruptible microgrid 200 is presented. In the uninterruptible microgrid 200, power sources 102 are connected to dual-output inverters 204a, 204b (collectively dual output inverters 204), and the dual-output inverters 204 are grid-tied to the utility power lines 110 through AC disconnect switches 106. Net metering devices 108 monitor the power being added to or drawn from the utility power lines 110 by the uninterruptible microgrid 200. However, the dual-output inverter 204 also connect to a set of local AC disconnect switches 206 that feed the power to the load 112 through a circuit breaker 114. Communication links 116 enable command, control and monitoring functionality.

The dual-output inverters 204 isolate the connection to the utility power lines 110 from the connection to the load 112, to minimize effects between the connections. The amount of power fed to the load 112 by each dual-output inverter 204 or from the utility power lines 110 is independently regulated. In the uninterruptible microgrid 200, the dual-output inverter 204 are able to seamlessly connect to and disconnect from the utility grid and utility power lines 110 without disrupting the power to the load 112.

Although the uninterruptible microgrid 200 is illustrated with two dual-output inverters 204 and a single load 112 for convenience, the uninterruptible microgrid 200 architecture can be adapted to support any number of loads 112, and utilize multiple output inverters (not shown.)

Figure 3:
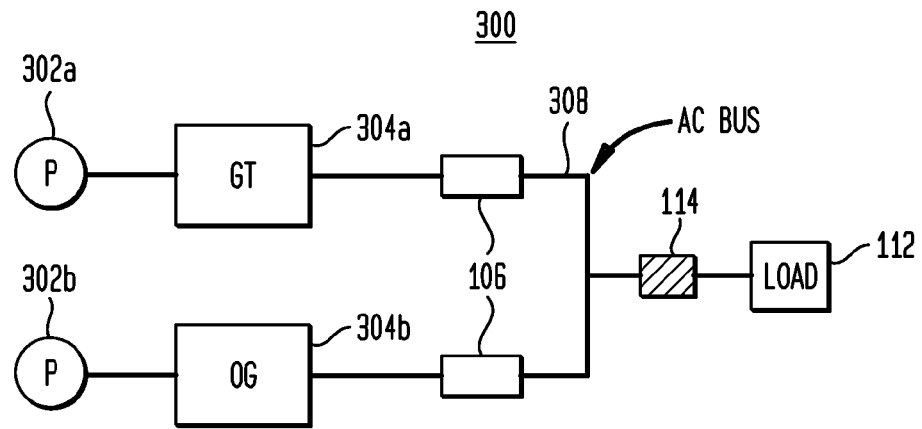
FIG. 3 is a diagram of an off-grid microgrid having one AC interface to the utility grid and one AC interfaces to an off-grid power source in one embodiment of the reconfigurable AC interface for microgrids.

Referring now to FIG. 3, a configuration for an off-grid microgrid 300 is presented. In a distributed off-grid microgrid 300, power source 302a, 302b (collectively power sources 302) are connected to inverter 304a and 304b (collectively inverters 304.) The inverters 304 are in parallel, with one of the inverters 304b being a master having an output that is constant voltage source for the off-grid microgrid 300. The other inverter 304a is the slave having an output that is a variable current source synchronized by the AC bus 308. The inverters 304 share power to the load 112 which is protected by a circuit breaker 114. In one embodiment of an off-grid microgrid 300 configuration, the master inverter 304b is supplied by a power source 302b such as a generator and thus is an off-grid inverter, while the slave inverter 304a is supplied by power source 302a, for example another generator. The slave inverter 304a synchronizes its AC output with the off-grid inverter, master inverter 304b, and thus the slave inverter 304a is a grid-tied inverter. Note that in some embodiments, the inverters 304 are grid-tied synchronous inverters that require AC power to be present at the synchronous inverters' output for the synchronous inverters to synchronize with. That is, in order to convert DC power to AC power, an AC power source must be available to provide synchronization. In these embodiments, synchronous inverters cannot be used in stand-alone application where power, either from a public utility, another microgrid, or another stand-alone inverter is not available.

Figure 4:
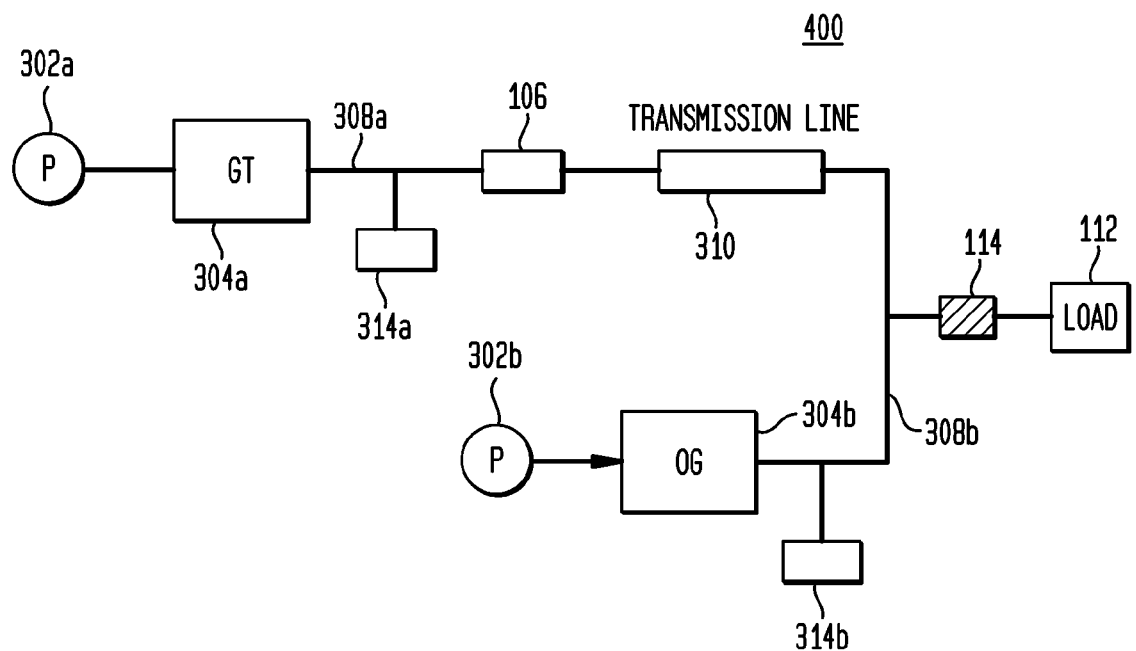
FIG. 4 is a diagram of a remote off-grid microgrid where a transmission line separates the utility from the local generation source and load in one embodiment of the reconfigurable AC interface for microgrids.

Referring now to FIG. 4, a configuration for a remote off-grid microgrid 400 is presented. In the remote off-grid microgrid 400, power source 302a, 302b (collectively power sources 302) are connected to inverter 304a and 304b (collectively inverters 304.) Power source 302a and inverter 304a provide power to remote AC bus 308a, while power source 302b and inverter 304b provide power to local AC bus 308b. Like the off-grid microgrid 300, one of the inverters 304b, the local inverter, is the master while the other inverter 304a, the remote inverter, is the slave. However, the remote AC bus 308a is connected through transmission line 310 to local AC bus 308b. The transmission line 310 enables the grid-tied inverter 304a and power source 302a to be displaced considerable distances away from the off-grid inverter 304b and local power source 304b. The power draw caused by the load 112 can vary, and the transmission line 310 has a non-zero impedance, which can cause phase differences between the local AC bus 308b and remote AC bus 308a. When required, load balancing regulators 314a and 314b (collectively load balancing regulators 314) regulate and balance the local AC bus 308b and remote AC bus 308a to better accommodate the instantaneous power draw on the local AC bus 308b by the load 112. In embodiments, these load balancing regulators 314 also includes controllable transmission line compensators to maintain the quality of the electrical power, for example using static var compensators, capacitor banks, and filters available from Schneider Electric.

Figure 5:
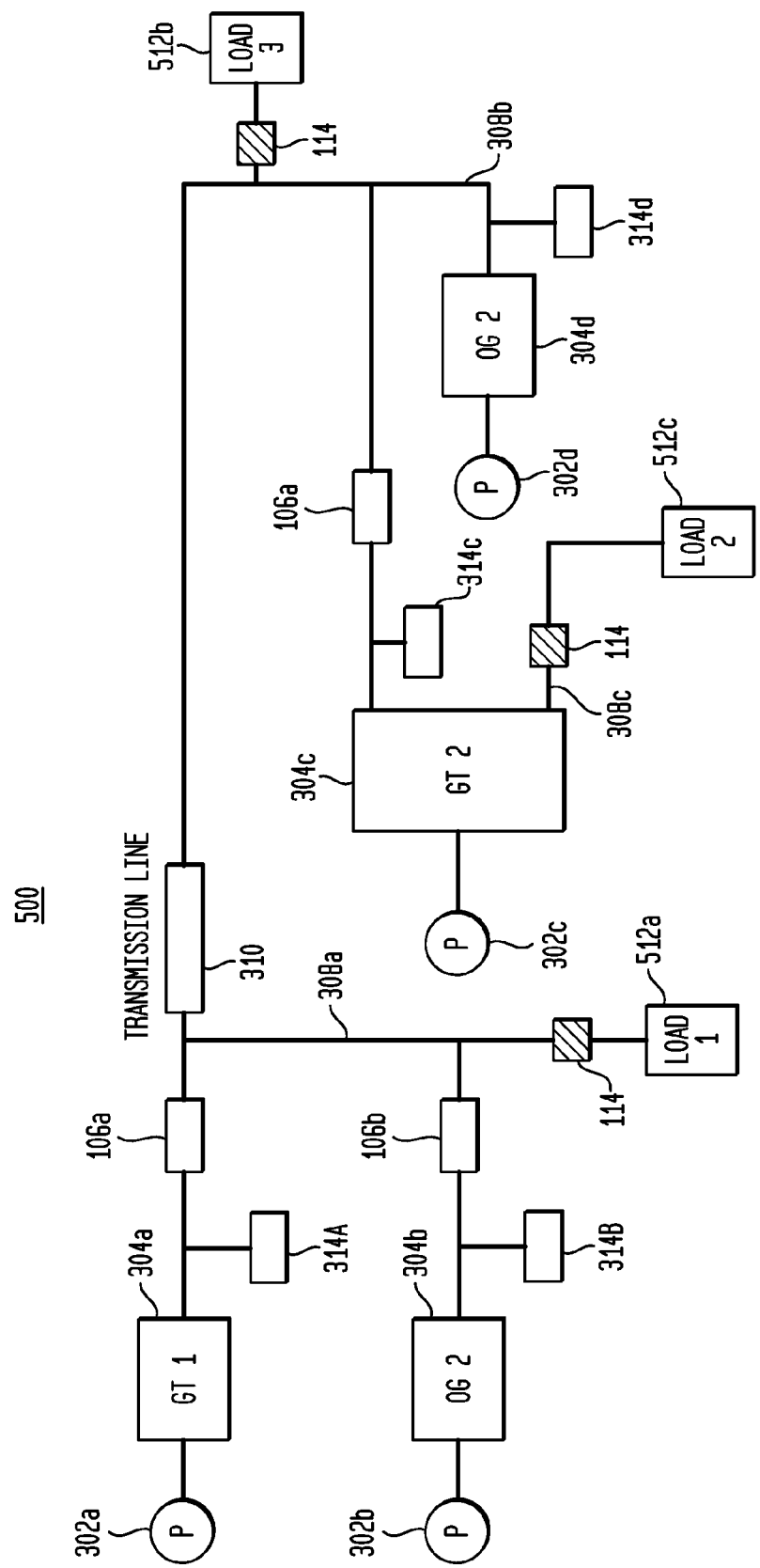
FIG. 5 is a diagram of a distributed microgrid having a plurality of connections to utility grids, off-grid power sources, and transmission lines in one embodiment of the reconfigurable AC interface for microgrids.

Referring now to FIG. 5, a configuration for a distributed microgrid 500 is presented. In the distributed microgrid 500, power sources 302a, 302b, 302c, and 302d (collectively power sources 302) are connected to inverters 304a, 304b, 304c, and 304d (collectively inverters 304.) Power source 302b and inverter 304b are off-grid and provide power for the first AC bus 308a. Power source 302a and inverter 304a are grid-tied to the first AC bus 308a. Inverter 304a and 304b provide power to a first AC bus 308a to which first load 512a is connected. Power source 302c and inverter 304c are grid-tied to the second AC bus 308b. Power source 302d and inverter 304d are off-grid and provide power from a second power generation source. Inverter 304c and 304d provide power to a second AC bus 308b to which a second load 512b is connected. The first AC bus 308a is connected to the second AC bus 308b by transmission line 310. A third load 512c is connected to inverter 304c via a third AC bus 308c. Load balancing regulators 314a, 314b, 314c, and 314d (collectively load balancing regulators 314) regulate and balance the loading on the AC busses 308a, 308b, and 308c (collectively AC busses 308.) The term AC bus 308 is intended to encompass internal busses inside equipment or facilities, as well as power wires and power lines external to equipment and facilities. The term AC bus 308 is used throughout for clarity of exposition, however no restriction solely to one specific type of AC bus is intended. In operation, the first load 512a, the second load 512b, and the third load 512c (collectively loads 512) receive power from any of the inverters 304. Circuit breakers 114 protect the AC busses 308 from the loads 512.

Inverters 304 and load balancing regulators 314 enable a seamless integration of various power sources 302 into a distributed microgrid 500. As illustrated in FIG. 5, the distributed microgrid 500 is shown in a stand-alone configuration, or islanded from the utility grid. However, in embodiments, the distributed microgrid 500 can be tied to the utility grid (not shown.) When tied to the utility grid, all of the inverters 304 are typically configured as grid-tied inverters. However, in embodiments, one or more of the inverters 304 can be configured as a synchronous voltage source. This configuration may be necessary or even critical for stability of the distributed microgrid 500, for example when the utility grid point of common contact (or POC) is over long transmission lines 310.

The distributed microgrid 500 can be tied to or isolated (islanded) from the utility grid, and distributed energy resource (DER) systems can be added or removed as power sources 302 as needed without disconnect or compromising the loads 512. DERs typically comprise a renewable energy resource coupled to a energy storage system, for example a battery, that stores the DC generated power until it is needed by the inverter 304.

In an embodiment, the inverters 304 comprise reconfigurable AC interfaces that convert the DC power from the DER into AC power. The inverters 304 can be constant current or voltage sources, depending upon if they are the master inverter or slave inverter as discussed above. When the inverter 304 is grid-tied to the utility grid, the inverter 304 output can be a constant current source synchronized with the utility grid. In embodiments where the inverter is a constant current source, the inverter 304 output is synchronized internally by an internal sine wave generator. However, the inverter 304 output can be a variable current source when synchronized with another inverter 304. Whether the output is synchronized with the utility grid or another inverter 304 is a system design choice. For example, if the utility grid is stable and access to the utility is widely available, as is typical in industrialized nations, then the distributed microgrid 500 can be synchronized to the utility grid. However, there are times when it is preferable for the distributed microgrid 500 to provide the synchronization, such as when power is used from multiple independent utility companies or sources, or if the utility power is generally unstable, as may be the case in developing countries, in outlying areas where utility service is unreliable, in times of war or civil strife, and for temporary installations such as on the battlefield.

The reconfigurable AC interface provide external power regulation and load balancing. To do this, the inverter 304 has two isolated outputs. A first output is to the shared load power demand. A second output is to the local load power demand. The power to the inverter 304 isolated outputs can be controlled and regulated by the amount of power available, enabling the inverter 304 to prioritize the power delivered to the share load and local loads. For example, if the shared power demand is greater or has a higher priority than the local loads, then the power to the local loads will be the leftover power after the share load demand power is met.

Some loads have variable power draws. For example, refrigeration units often require a very high initial startup power as the compressors turn on, but then settle to a lower steady state power utilization. Similarly, motors and other non-linear loads have impedances that contribute to off-balancing the AC busses 308 which can lead to the power becoming unregulated or unsynchronized. To compensate, load balancing regulators 314 are utilized to stabilize the AC busses 308. In an embodiment, the load balancing regulators 314 have passive decoupling elements, such as capacitors or capacitor-inductor circuits, that prevent surges and provide instantaneous power as needed. In addition to the decoupling elements, the load balancing regulators 314 may utilize active components to compensate unbalanced voltages between each phase, as would be understood in the art. An example load balancing regulator 314 is the Automatic Voltage Regulator, a modular power conditioning system available from Staco Energy Products Company. The inverter 304 then regulates the AC power from transients to achieve efficient power transfer from the power source 302 to the load 512.

Figure 6:
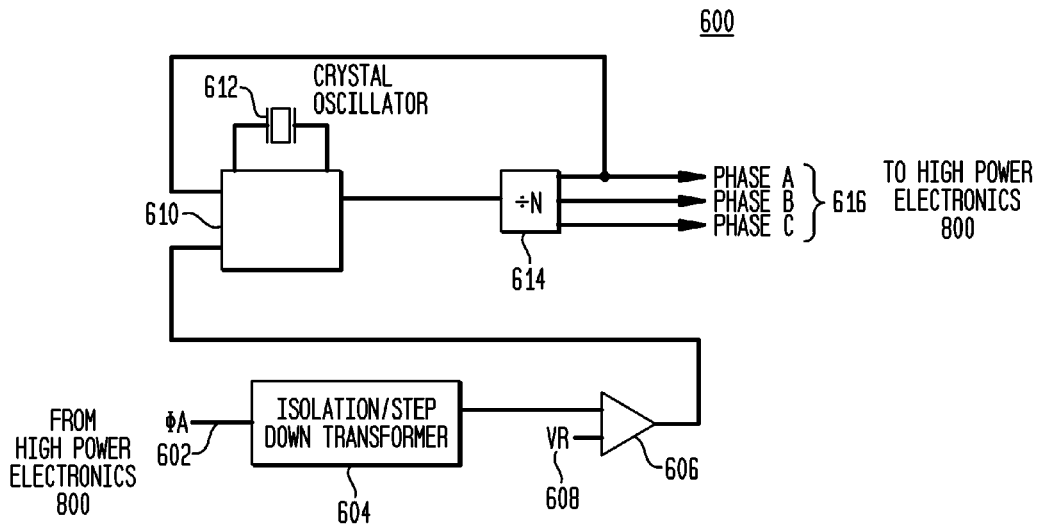
FIG. 6 a diagram of an internal sine wave generator in one embodiment of the reconfigurable AC interface for microgrids.
Figure 7:
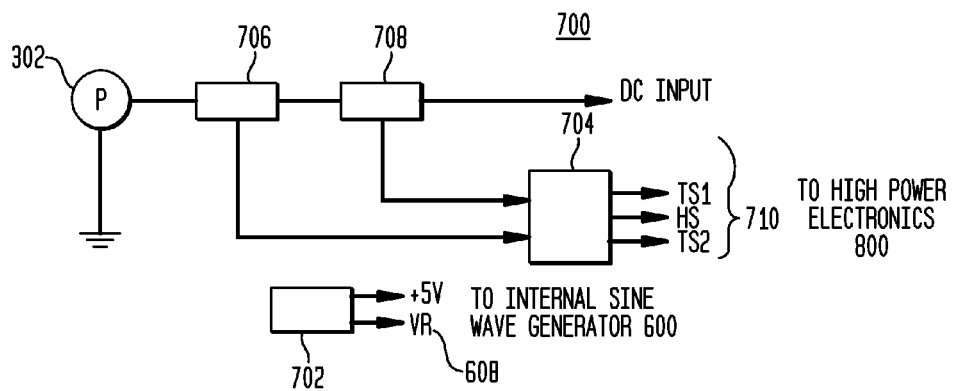
FIG. 7 is a diagram of a DC input front end in one embodiment of the reconfigurable AC interface for microgrids.

Referring now to FIG. 6, in an embodiment, in addition to the AC disconnect switches 106, the inverters 304 are designed with an internal sine wave generator 600. The internal sine wave generator 600 comprises an isolated synchronization input 602 that connects to one phase of a utility power line 110 or AC bus 308. The isolated synchronization input 602 is isolated using an isolation transformer 604, which in embodiments is a step-down transformer. A comparator 606 compares the waveform from the isolation transformer 604 to a voltage reference 608 and outputs a square wave. A voltage controlled comparator, or VCO 610, uses the square wave from the comparator 606, a crystal oscillator 612, and feedback from one phase of the three-phase outputs 616 of the VCO 610 to phase lock the VCO 610 to the phase and frequency of the isolated synchronization input 602 (in practice, the VCO 610 is phase locked to a multiple of the frequency, and which is then reduced to the desired frequency by a divide-by-N counter 614.) This allows the internal sine wave generator 600 to quickly synchronize the distributed microgrid 500 to the local power grid. If there is no input from the isolated synchronization input 602, the VCO 610 maintains the last known phase and frequency, which may be the frequency derived by the VCO 610 using only the crystal oscillator 612. The output of the VCO 610 is input to a divide-by-N counter 614 that takes the output of the VCO 610 and divides it down to produce the three-phase outputs 616. Three-phase outputs 616 are typically at 50/60 Hz with phases differences of 0 degrees, 120 degrees, and 240 degrees. In embodiments, the frequency and phases can be selected for the type of system, for example many aircraft and aerospace vehicles utilize 400 Hz. The three-phase outputs 616 are used by the inverters 304 to convert DC power from a DER, or other power source, into AC power at a frequency and phase appropriate for powering a utility power line 110 or AC bus 308.

The isolated synchronization input 602 of the internal sine wave generator 600 is connected to the utility grid if the inverter 304 is grid-tied, or the primary master inverter 304 if the inverter 304 is off-grid. If the inverter 304 is connected to the utility grid, or grid-tied, the synchronization input of inverter 304 allows the internal sine wave generator 600 to phase-lock with a utility power line 110. If this inverter 304 is assigned as the primary master inverter 304, the internal sine wave generator 600 will synchronize to the power grid to facilitate seamless power transfer.

In an embodiment DC power from a distributed energy resource (DER) systems is connected to a DC input 700 front end. The DC input 700 front end comprises an AC-to-DC power supply 702 that provides a voltage reference 608 for the internal sine wave generator 600, as well as DC voltages for powering the control unit 704, other computing logic, and electronics of the inverter 304. Although shown as a +5V output for illustration purposes only, it should be noted that the outputs of the AC-to-DC power supply 702 can be 3.3V, 5V, 12V, −12V, −48V, or any other power as desired for implementing the inverter 304 and supporting electronics. An example AC-to-DC power supply 702 is a Genesys™ AC-to-DC programmable power supply from TDK-Lambda. As would be understood by one of ordinary skill in the art, in embodiments the AC-to-DC power supply 702 can be a DC-to-DC power supply utilizing DC power directly from the DER. The DC input 700 also comprises a voltage meter 706 and current meter 708 that provides information regarding the power draw or power availability from the DER. In embodiments, the voltage meter 706 and current meter 708 are inline, or outside the power line, for example using Hall Effect sensors. In embodiments, the DER itself provides voltage and current outputs to the DC input 700. A control unit 704 comprises logic that monitors the voltage sensed by the voltage meter 706, and current sensed by the current meter 708 of the DER, along with the Hall Sensors 802 associated with an AC bus interfaces 806a or local load interface 806b of a transfer switch 804 of FIG. 8. The control unit 704 uses these sense inputs to determine how to configure the reconfigurable transfer switches 804 to provide power to the loads 112. For example, the control unit 704 can enable paralleling of inverters 304 with constant voltage source outputs to provide redundant power to a load 112. In embodiments, the control unit 704 accepts external signals or commands for configuring the transfer switches 804 according to user inputs. For example, in response to user or utility commands, the control unit 704 can configure the transfer switches 804 to shed low priority loads 112 in response to a utility request, to move loads 112 off of the utility grid and power them using DER resources, or to island the loads from the utility grid in the event of instability in the utility grid. In embodiments, the control unit 704 monitors the AC bus interfaces 806a using an optical isolator (not shown) that measures the utility grid voltage.

Figure 8:
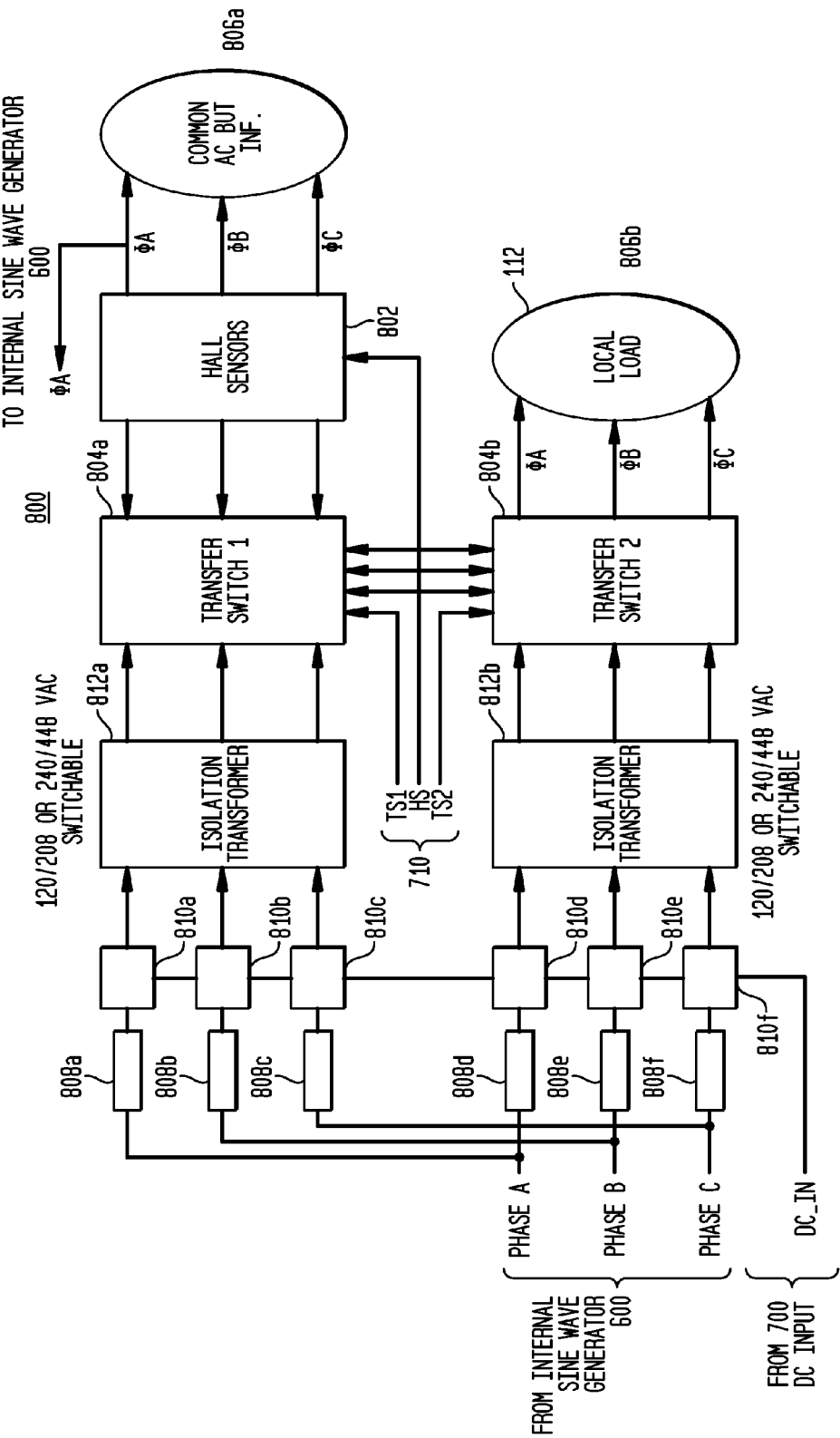
FIG. 8 is a diagram of high power electronics in one embodiment of the reconfigurable AC interface for microgrids.

Referring now to FIG. 8, in an embodiment, the inverter 304 comprises high power electronics 800 for converting the DC power into AC power, and dynamically routing the power from the utility grid and DERs to loads. To produce AC power from the DC inputs of the DERs, isolated gate bipolar transistors, or IGBTs 810a, 810b, 810c, 810d, 810e, 810f (collectively IGBT 810) chops the DC power from the DC Input 700 which is stepped up to the desired voltage by an isolation transformer 812a or 812b (collectively isolation transformer 812.) The waveform produced by the IGBT 810 and thereafter by the isolation transformer 812 is determined by a driver circuit 808a, 808b, 808c, 808d, 808e, 808f (collectively driver circuit 808), which shapes the inputs from the three-phase outputs 616 of the internal sine wave generator 600 into waveforms appropriate for generating approximately sinusoidal AC waveforms out of the isolation transformer 812. In one embodiment, the driver circuit 808 produces a sinusoid waveform from the three-phase output 616 of the internal sine wave generator 600. Driver circuits 808 and IGBTs 810 are high power conversion circuits commonly available in the power industry. One non-limiting example of an isolation transformer 812 is a dry-type transformer such as the RESIBLOC® dry-type transformer available from the ABB group. The isolation transformers 812 can be 120/208 VAC, 240/448 VAC, or any other voltage, and any standard or non-standard frequency such as 50 Hz, 60 Hz, 400 Hz, etc. In one embodiments, the isolation transformers 812 and internal sine wave generator 600 are dynamically switchable, allowing the high power electronics 800 to create power that is appropriate to the current operating environment. For example, the internal sine wave generator 600 would generate 60 Hz waveforms for operations in the United States, but would switch to 50 Hz waveforms when operating in Europe or Asia. In most parts of the world, other than the United States, power is delivered at 50 Hz.

The approximately sinusoidal AC waveforms from the isolation transformers 812 are fed into one or more or transfer switches 804a, 804b (collectively transfer switches 804.) The transfer switches 804 are the part of the reconfigurable AC interfaces that dynamically route power between power sources and loads 112. The transfer switches 804 have electrical interfaces for receiving and retransmitting AC power from various sources such as inverters 304, utility lines 110, AC power buses 308, loads 112, etc. In embodiments, the transfer switches 804 connect exactly one interface to exactly one other interface. For example, the transfer switch 804 can connect an inverter 304 to a load 112; or the transfer switch 804 can connect the output of another transfer switch 804 to a utility line 110. In alternate embodiments, the transfer switches 804 connect one interface to a plurality of other interfaces. Example transfer switches 804 are Kohler transfer switches, rated at 150 Amps to 4000 Amps with transition types being normally closed or programmed. The transfer switches 804 accept inputs, for example commands or signals, from the control unit 704 and dynamically reconfigure to route power between the isolations transformers 812, the common AC bus interface 806*a*, and the local load interface 806*b*. The transfer switches 804 allow power to be transferred to and from the common AC bus interface 806*a*. For example, if the common AC bus interface 806*a* is connected to a utility power line 110, or power grid, then power generated from a DER can be sold back to the utility and used by loads in the power grid. Or if a local load 112 requires power, then the transfer switches 804 can be configured to deliver power from the utility power line 110 connected to the common AC bus interface 806 to the local load 112 connected to the local load interface 806*b*. Similarly, the transfer switches 804 allow power to be transferred to and from the common AC bus interface 806*a* when it is connected to a AC bus 308. In embodiments, the AC bus interfaces 806 comprise Hall Effect sensors 802 for monitoring the current and/or voltage of the common AC bus interface 806*a*. The Hall Effect sensors 802 permit the control unit 704 to monitor the power being transferred across the common AC bus interface 806*a* and dynamically configure the transfer switches 804 to provide power to the loads 110.

The transfer switches 804 provide reconfigurable AC interfaces to connect or isolate parts of the distributed microgrid 500 from one or more of the utility grids. When the distributed microgrid 500 is connected to a utility power line, or power grid, the inverters 304 are seamlessly connected to or can be disconnected from the power grid. Although two transfer switches 804 are provided in the illustration, inverters 304 having two, three, or any number of transfer switches 804 are envisioned to support multiple connections to loads, AC busses 308, and inversion electronics 808, 810, 812. The ability to dynamically route power from sources to loads using the transfer switches 804 makes the inverter 304 a reconfigurable AC interface. It should be noted that a reconfigurable AC interface does not necessarily have to include the inverter functionality, and can include only the transfer switches 804 in embodiments.

In one embodiment, the control unit 704 monitors the voltage and current from the DER and the voltage and current from the common AC bus interface 806*a*. If the power from the DER is within the specified voltage and current levels for a predetermined period of time, e.g., three seconds, then the control unit 704 will configure the transfer switch 804*a* to close so that power flows from the isolation transformer 812*a* to the common AC bus 806*a*, and to either an AC bus 308 or utility power line 110. During this transfer of DER power to the utility grid, the control unit 704 continuously tracks the DER inputs to ensure that the DER power is within range. In an embodiment, the control unit 704 performs maximum point power tracking, or MPPT, on the DER inputs. The control unit 704 also continuously monitors the common AC bus 806*a* in order to detect any errors on the utility grid. When DC power is below the specified voltage and current levels, the control unit 704 will configure the transfer switch 804*a* to open, preventing power from back from the utility power line 110 to the isolation transformer 812*a*. However, the connections between the transfer switch 804*a* and transfer switch 804*b* remain closed so that power from the utility power line 110 continues to flow into the local load interface 806*b* and load 112. The control unit 704 disconnects the transfer switch 804*a* when conditions are present on the common AC bus 806*a* that could damage the inversion electronics 808*a*, 810*a*, 812*a*. The control unit 704 monitors the common AC bus 806*a* to make sure the AC utility power grid is healthy, otherwise it disconnects the transfer switch 804*a* from the utility grid and reconnects when the AC utility power grid is healthy again.

Although the present disclosure shows a distributed microgrid 500 for three phase power, the distributed microgrid 500 is equally applicable to single phase electrical power, for example 110/120V electrical systems or any other single phase electrical power systems.

Figure 9:
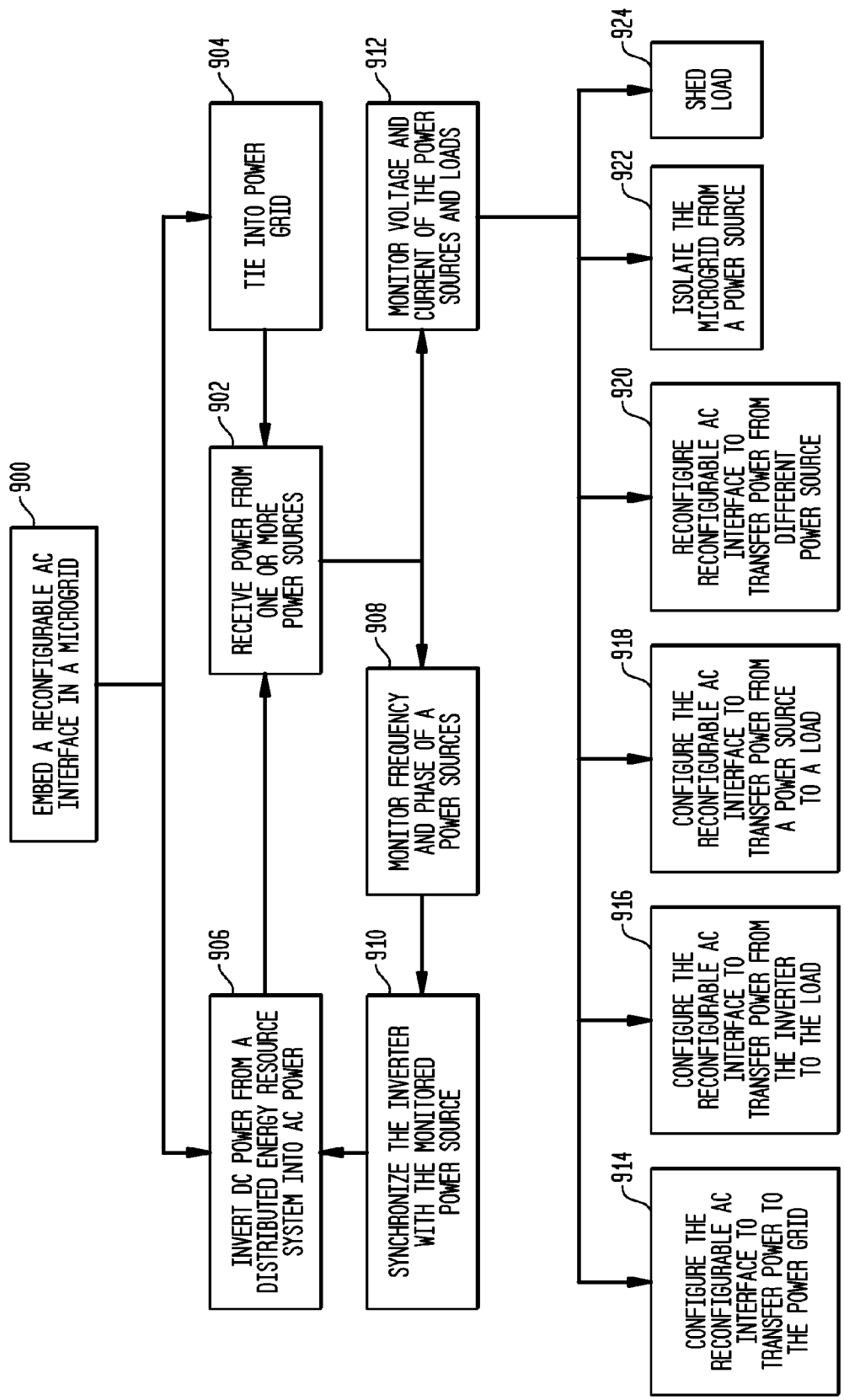
FIG. 9 is a flowchart of an exemplary method of implementing a reconfigurable AC interface in a microgrid in one embodiment of the reconfigurable AC interface for microgrids.

Referring now to FIG. 9, a flowchart of an exemplary method of embedding 900 a reconfigurable AC interface into a distributed microgrid 500 is presented. The reconfigurable AC interface receives 902 power from one or more power sources 302, for example by tying 904 into a power grid or by inverting 906 DC power from a DER system into AC power. If the reconfigurable AC interface ties into the power grid, then the frequency and phase of the power grid is monitored 908 and the reconfigurable AC interface is synchronized 910 with power grid. The reconfigurable AC interface monitors 912 the voltage and current of the power sources 302 and loads 112. The reconfigurable AC interface monitors 912 the voltage and current in order to determine which power sources 302 and loads 112 are to be connected. For example, when starting up as an inverter 304 that is configured to be a master (i.e., the other inverters 304 are slaves or remote AC interfaces), a reconfigurable AC interface first checks to ensure that there isn't already power on the power line of the distributed microgrid 500. The reconfigurable AC interface can be configured a number of different ways, depending upon the desired configuration of the distributed microgrid 500 and the power sources 302 and loads 112 present. If a DER system is providing more power than is required by the loads of a microgrid, the reconfigurable AC interface is configured to transfer power back into the power grid 914. If a load 112 is to be powered from a local DER, the reconfigurable AC interface is configured to locally transfer power 916 from the inverter 304 connected to the DER to the load 112. If a load requires power, the reconfigurable AC interface is configured to transfer 918 power from a power source 302, such as a power grid, DER, or generator, to the load 112. If that power source 302 should fail, or need to be taken out of service, of if the load on the power line of the distributed microgrid 500 requires more power, then the reconfigurable AC interface is configured to provide uninterruptable power 920 by transferring power from one or more other power sources 304 to the load 112. If the power grid becomes unstable, or if owner of the distributed microgrid 500 is requested, then the reconfigurable AC interface can isolate 922 the distributed microgrid 500 from the power grid, or from any other power source 302. Additionally, if necessary, the reconfigurable AC interface can be used to shed loads 924 by isolated individual loads or power lines connected to multiple loads. In embodiments, those loads 112 can be unpowered, or continued to be powered by the DERs and inverters 304 as desired.

Figure 10:
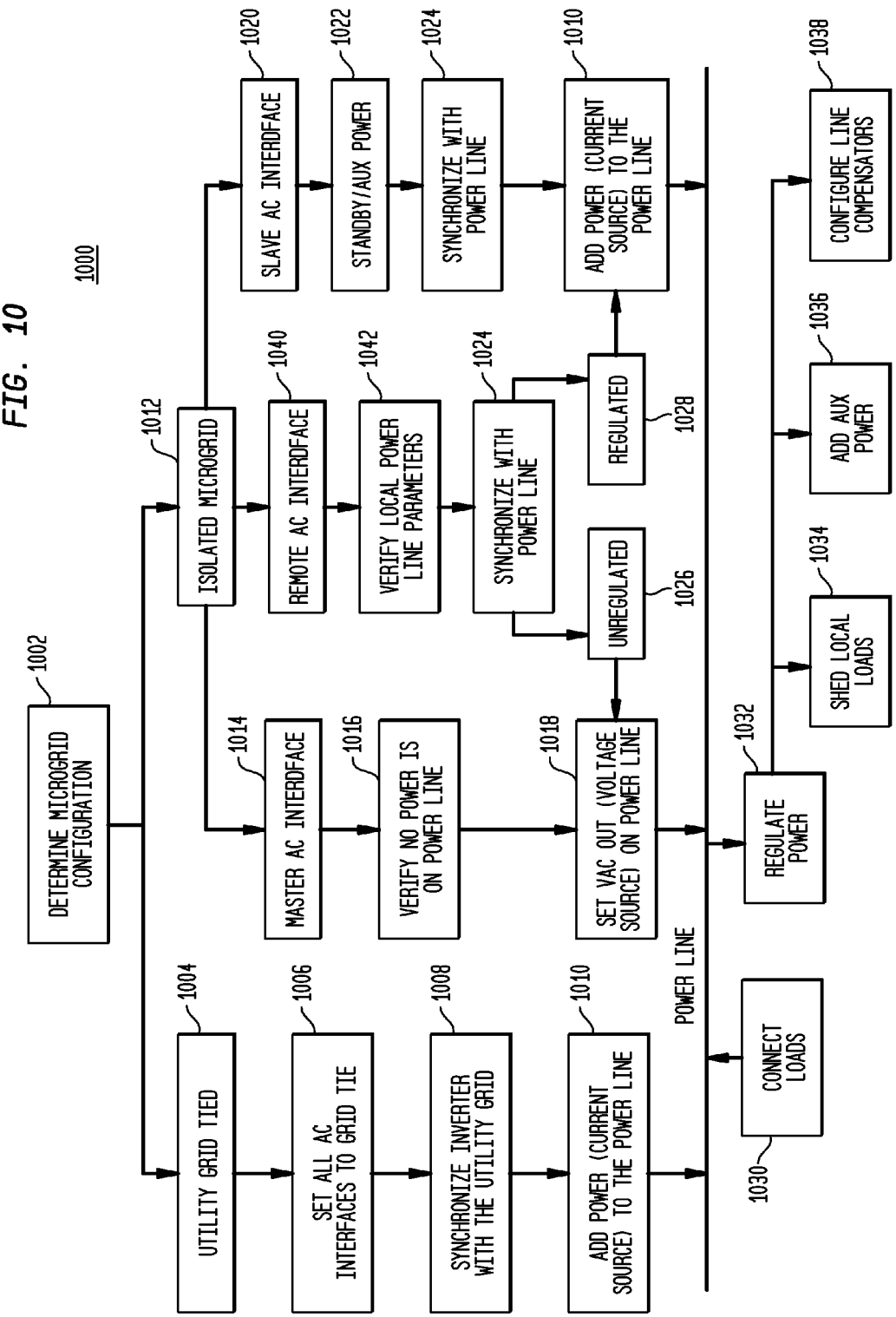
FIG. 10 is a flowchart of an exemplary method of controlling a reconfigurable AC interface in a microgrid in one embodiment of the reconfigurable AC interface for microgrids.

Referring now to FIG. 10, a flowchart of an exemplary method of controlling 1000 a reconfigurable AC interface into a distributed microgrid 500 is presented. First, the current configuration of the distributed microgrid 500 is determined 1002. If the distributed microgrid 500 is grid tied 1004 to a utility, such as a utility power grid, then all of the reconfigurable AC interfaces are set to the grid tied configuration 1006. The inverters 304 of the reconfigurable AC interfaces synchronize 1008 with the frequency and phase of the utility grid, and the reconfigurable AC interface adds power 1010 to the power line as a current source. If the distributed microgrid 500 is not grid tied, then the distributed microgrid 500 is running in an isolated microgrid configuration 1012. One of the inverters 304 in the distributed microgrid 500 is configured as a master AC interface 1014. The master AC interface verifies 1016 that no power is on the power line, and then supplies the reference voltage VAC 1018 to the power line that the other inverters 304 use as a reference frequency and phase. The other local inverters 304 are therefore configured as slave AC interfaces 1020. These slave inverters 304 are placed in either auxiliary or standby mode 1022, depending upon whether power is currently needed or not. Inverters 304 that are configured as slave AC interfaces 1020 are synchronized 1024 with the power line and add power 1010 to the power line as current sources. Inverters 304 that are remote, for example at the other end of a transmission line 310, are configured as remote AC interfaces 1040. These remote inverters 304 verify 1042 their local power line parameters, for example whether there is power on the line, the line impedance, the power level, frequency, phase, and stability of the frequency and phase. The remote inverters 304 synchronize 1024 with the power line. If a remote inverter 304 is running in an unregulated mode 1026, for example if there is no nearby utility grid and the remote inverter is the only power source for the power line, then the remote inverter 304 supplies the reference voltage VAC 1018 to the power line. Other remote inverters 304 run in a slave configuration to remote inverter 304 and run in a regulated mode 1028. If a remote inverter 304 is running in a regulated mode 1028 it will add power 1010 to the power line as a current source. The distributed microgrid 500 also regulates 1032 the power line by shedding local loads 1034, adding auxiliary power sources 1036, and configuring line compensators 1038 as necessary to keep the power stable. Loads can also be dynamically added to the distributed microgrid 500 and connected 1030 to power lines.

The embodiments of the invention shown in the drawings and described above are exemplary of numerous embodiments that may be made within the scope of the appended claims. It is contemplated that numerous other configurations of the system and method for providing reconfigurable AC interfaces for AC power systems may be created taking advantage of the disclosed approach. It is the applicant's intention that the scope of the patent issuing herefrom will be limited only by the scope of the appended claims.

What is claimed is:

1. A method for controlling a microgrid, comprising:
   embedding a plurality of reconfigurable AC interfaces each with interface nodes in the microgrid, the microgrid comprising a load and a plurality of power sources in electrical communication with said interface nodes, said reconfigurable AC interfaces comprising at least a first reconfigurable AC interface of a first distributed energy resource system and a second reconfigurable AC interface of a second distributed energy resource system, and wherein said reconfigurable AC interfaces are configured to transfer power from at least one of said power sources to said load;
   synchronizing an AC output of the first reconfigurable AC interface of said first distributed energy resource system with the second reconfigurable AC interface of said second distributed energy resource system;
   monitoring a voltage and current of at least one of said interface nodes of said first reconfigurable AC interface and said second reconfigurable AC interface; and
   switching said one of said first reconfigurable AC interface and said second reconfigurable AC interface to transfer power between said first distributed energy resource and said second distributed energy resource systems to provide an uninterruptable supply of power to said load based on said monitoring of said voltage and said current.

2. The method of claim 1, further comprising:
   monitoring a frequency and a phase of said interface nodes of said second reconfigurable AC interface; and
   synchronizing an internal phase locked oscillator of said first reconfigurable AC interface to said frequency and said phase of said second reconfigurable AC interface.

3. The method of claim 1, wherein said power sources further comprise a utility power grid.

4. The method of claim 3, wherein said reconfigurable AC interfaces invert a DC power from a distributed energy resource system into an AC power for said load.

5. The method of claim 1, wherein said power sources comprise a utility power grid, and further comprising:
   transferring power from distributed energy resource systems to said utility power grid through a selected one of said reconfigurable AC interfaces.

6. The method of claim 5, further comprising:
   transferring power from said distributed energy resource systems to said load through said selected one of said reconfigurable AC interfaces.

7. The method of claim 5, further comprising:
   isolating a power source electrically connected to an interface of said selected one of said reconfigurable AC interfaces if said power of said power source falls below a specified power; and
   reconnecting said power source if said power returns to a specified power for a specified period of time.

8. The method of claim 7, further comprising:
   transferring power from a utility power grid to said load through said selected one of said reconfigurable AC interfaces.

9. The method of claim 1, further comprising:
   load balancing power from a first of said power sources that is transferred across a transmission line to one of a load and a second of said power sources.

10. The method of claim 1, wherein said first reconfigurable AC interface is a slave inverter and said second reconfigurable AC interface is a master inverter.

11. A reconfigurable AC interface for microgrids, comprising:
    an inverter for converting a DC power source to an AC power source;
    a first transfer switch comprising a first electrical interface to said inverter and a second electrical interface to a first AC bus, said first AC bus electrically connected to a utility power grid, and said first transfer switch configured to selectively connect and transfer power from said DC power source to said utility power grid based on said power from said DC power source being within a specified voltage and current level;
    a second transfer switch comprising a third electrical interface to said first transfer switch, and a fourth electrical interface to a second AC bus, said second AC bus electrically connected to a load, and wherein power from said utility power grid is selectively provided to said load through said third electrical interface to said first transfer switch; and a controller configured to dynamically configure said first transfer switch and said second transfer switch to transfer power between said inverter, said first AC bus, and said second AC bus, said controller configured to dynamically configure said first transfer switch to disconnect said inverter from said utility power grid if said power from said DC power source is below said specified voltage and current level while allowing power from said utility power grid to flow to said load through said third electrical interface to said first transfer switch.

12. The reconfigurable AC interface of claim 11, wherein said controller is configured to dynamically configure said first transfer switch and said second transfer switch so that said load is isolated from said utility power grid, and said load receives power from said inverter, without interrupting power to said load.

13. The reconfigurable AC interface of claim 12, wherein said controller is configured to receive a signal to isolate said load from said utility power grid.

14. The reconfigurable AC interface of claim 11, further comprising:
a sensor for detecting electrical parameters of said first AC bus; and
wherein said controller is configured to dynamically configure said first transfer switch to isolate said first AC bus based on said electrical parameters detected on said first AC bus.

15. The reconfigurable AC interface of claim 14, wherein said controller is configured to dynamically configure said first transfer switch to reconnect to said first AC bus based on said electrical parameters on first AC bus attaining a specified voltage and current for a predetermined period of time.

16. The reconfigurable AC interface of claim 11, further comprising:
a second inverter for converting said DC power source to an AC power source; and
wherein said second transfer switch further comprises a fifth electrical interface to said second inverter; and
wherein said controller configured to dynamically configure said first transfer switch to transfer power from said inverter to said first AC bus, and dynamically configure said second transfer switch to transfer power between said second inverter and said second AC bus.

17. The reconfigurable AC interface of claim 11, further comprising:
a sensor for monitoring a frequency and a phase of said second electrical interface to said first AC bus; and
a phase locked oscillator in communication with said sensor for synchronizing said reconfigurable AC interface to said frequency and said phase.

18. The reconfigurable AC interface of claim 11, wherein said DC power source is a distributed energy resource system.

19. A system, comprising:
a plurality of inverters for converting a DC power source to an AC power source, the DC power source comprising a plurality of DC sources that are part of a microgrid, wherein one of said inverters includes an AC output that is synchronized with another one of said inverters;
a plurality of interconnected transfer switches for electrically interconnecting between said inverters, an AC power source, and an AC power bus;
a plurality of sensors for monitoring said DC power source and said AC power source; and
a controller that dynamically configures said interconnected transfer switches to control the flow of power between said inverters, said AC power source, and said AC power bus, based at least in part upon a sensor reading from said plurality of sensors, wherein said controller is dynamically configured to transfer power from a first of said plurality of DC sources to at least a second of said plurality of DC sources to provide an uninterruptable supply of power to a load.

20. The system of claim 19, wherein said controller configures said interconnected transfer switches to the configuration selected from the group consisting of electrically isolating said AC power source from the load on said AC power bus; switching said AC power bus from said AC power source to one of said inverters without interrupting power to said AC power bus; electrically isolating said plurality of inverters from said AC power source; and electrically connecting a first of said inverters to said AC power source and a second of said inverters to said AC power bus.

* * * * *